United States Patent [19]

Markfelt

[11] 4,219,773
[45] Aug. 26, 1980

[54] WELL CASING FINDER INSTRUMENT WITH MOVABLE MAGNET AND MAGNETICALLY OPERATED SWITCH

[75] Inventor: Reinhold S. Markfelt, Minneapolis, Minn.

[73] Assignee: UOP Inc., Des Plaines, Ill.

[21] Appl. No.: 957,262

[22] Filed: Nov. 2, 1978

[51] Int. Cl.² .................. G01R 33/00; H01H 36/00
[52] U.S. Cl. .......................... 324/221; 166/65 M; 324/67; 335/205
[58] Field of Search .......... 324/67, 220, 221, 228, 324/346; 335/153, 205, 207; 166/65 M; 340/686

[56] References Cited

U.S. PATENT DOCUMENTS

| | | | |
|---|---|---|---|
| 2,580,457 | 1/1952 | Norris | 324/221 X |
| 2,971,381 | 2/1961 | Tesi | 324/67 X |
| 3,234,455 | 2/1966 | Idel | 324/220 |
| 3,250,875 | 5/1966 | Wintriss | 335/153 X |
| 3,303,457 | 2/1967 | Akesson | 340/686 X |
| 3,363,208 | 1/1968 | Galet | 324/228 X |
| 3,564,171 | 2/1971 | Hammond | 335/205 X |
| 3,691,490 | 9/1972 | Ragni | 335/205 |
| 3,896,280 | 7/1975 | Blake | 340/686 |
| 4,074,095 | 2/1978 | Romanowski | 335/205 X |

Primary Examiner—Gerard R. Strecker
Attorney, Agent, or Firm—James R. Hoatson, Jr.; Barry L. Clark; William H. Page, II

[57] ABSTRACT

Instrument for locating the depth of the lower end of a mild steel or cast iron well casing or a plastic casing attached to a mild steel well screen has an elongated weighted body portion containing one fixed magnet engageable with the casing and located at the upper end of the instrument. A radially movable magnet is encapsulated in the body of the instrument, preferably at a lower location than the fixed magnet. The movable magnet is normally magnetically biased toward the casing when a ferrous casing or well screen is present adjacent the instrument but is magnetically urged toward the ferrous metal contacts of a switch located internally of the instrument to actuate a signal device when there is no ferrous casing or well screen adjacent the movable magnet. The instrument is suspended in the casing by a cable containing electrical conductors attached to the switch contacts and to the signal device.

5 Claims, 5 Drawing Figures

U.S. Patent     Aug. 26, 1980     4,219,773
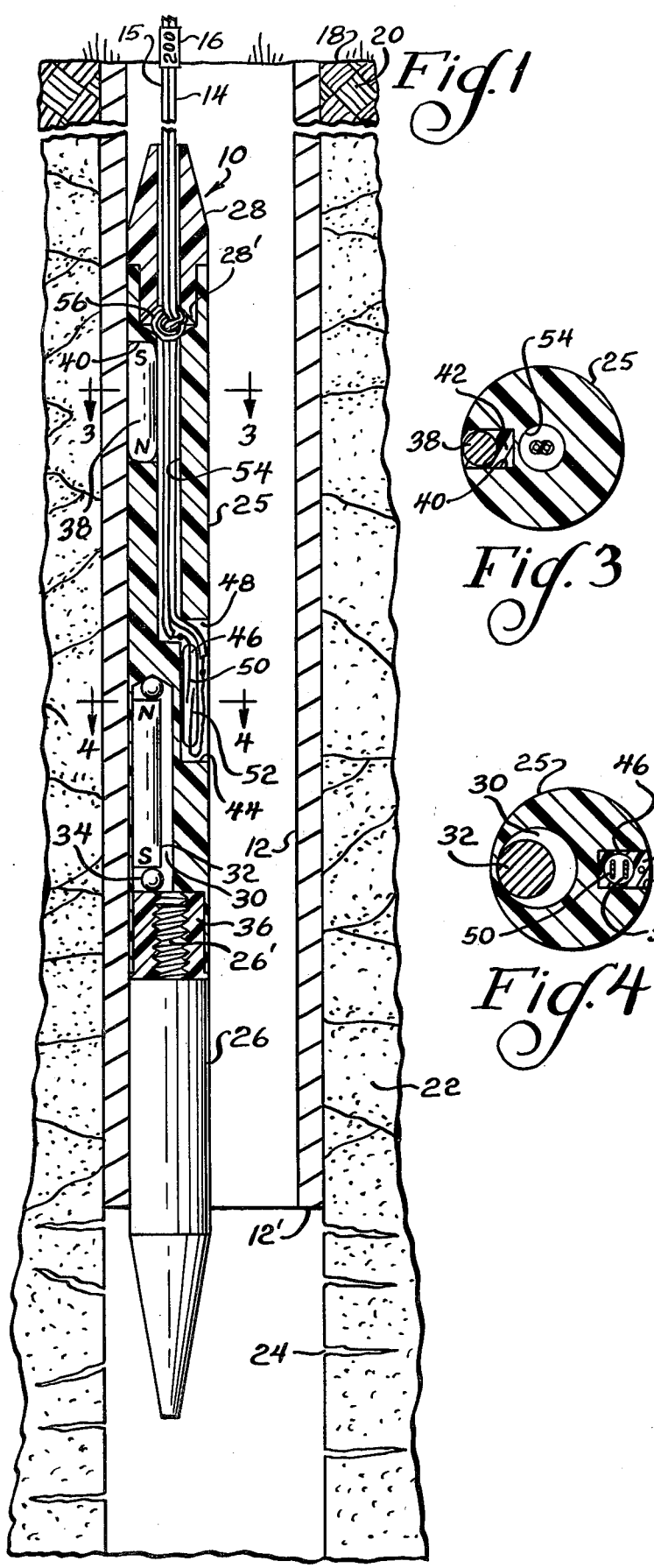
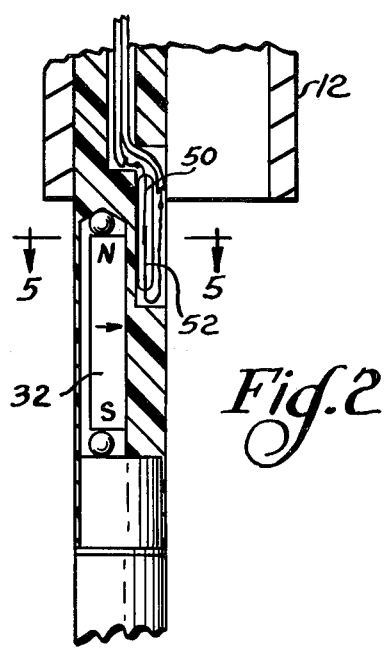
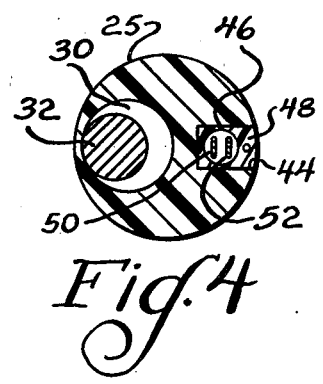
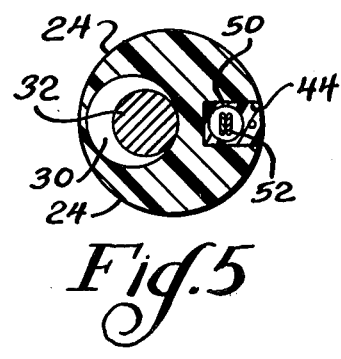

WELL CASING FINDER INSTRUMENT WITH MOVABLE MAGNET AND MAGNETICALLY OPERATED SWITCH

BACKGROUND OF THE INVENTION

The invention relates to wells and particularly to the rebuilding or evaluating of existing water wells. Many existing water wells are drilled in water-bearing, permeable rock such as sandstone or limestone. Presumably, the rock apparently seemed quite stable when these wells were drilled since a large number of them were completed without having well screens affixed at the lower ends of their steel casings. Such "open hole" wells, after years of use, often tend to pump sand as the continued flow of water through the rock develops fissures and fractures of the rock. Since such a condition cannot be tolerated, it is desirable to rehabilitate the well by installing a screen in the open hole beneath the casing and a graded gravel pack in the annulus between the screen and the sides of the hole. The screen would typically have a diameter about 2" less than the casing and would have a riser attached at its top which would be sealed to the casing with a lead or rubber packer ring after the insertion of the gravel pack. In order to rehabilitate a well, it is, of course, necessary to know exactly how far down the casing extends. Although records are usually kept concerning the construction of a particular well, there are occasions when no information is available to show the depth of the well casing. This information is necessary but is now only obtainable by electrically logging the well, an operation that is both expensive and time consuming.

SUMMARY

It is among the objects of the present invention to provide a simple, easy to use, lightweight instrument which can detect the end of a mild steel or cast iron well casing or a plastic well casing having a mild steel well screen attached to it so that the depth of casing can be determined. These and other objects are attained by the instrument of the present invention which comprises an elongated, tubular body portion suspended from a cable containing electrical conductors which is preferably marked at intervals to indicate depth. The body portion has a fixed magnet embedded in one side surface thereof, and a radially movable magnet mounted in the same radial plane as the fixed magnet for radial movement toward and away from the side surface at a location spaced axially along the length of the body portion from the fixed magnet. A magnetic reed switch having ferrous contacts is positioned in the body portion adjacent the radial path of the movable magnet. The contacts of the reed switch are normally open and are connected through the electrical conductors to an electrical signal device such as a light or horn located at the upper end of the cable. When the instrument is being lowered within a ferrous casing, the fixed magnet and the movable magnet will both be attracted to the casing wall but the weight of the instrument will permit it to slide along the casing. However, when the portion of the instrument containing the movable magnet goes beyond the ferrous casing the movable magnet will become attracted toward the ferrous contacts in the reed switch and will move radially toward them. As the magnet moves closer to the contacts the contacts will close and thereby activate a signal at the surface. The signal may be any suitable device such as a light or a horn and may be powered by circuitry such as that disclosed in my U.S. Pat. No. 3,909,948, the disclosure of which is incorporated by reference herein, to minimize current drain even though the cable might have a length of 200-500 feet, for example.

BRIEF DESCRIPTION OF THE DRAWINGS

FIG. 1 is a side sectional view of a mild steel well casing in which the instrument of the invention is suspended;

FIG. 2 is a view similar to FIG. 1 but showing the instrument after it has been lowered to position the movable magnet just past the bottom of the magnetically attractive well casing;

FIG. 3 is a cross-section taken on line 3—3 of FIG. 1;

FIG. 4 is a cross-section taken on line 4—4 of FIG. 1; and,

FIG. 5 is a cross-section taken on line 5—5 of FIG. 2.

DETAILED DESCRIPTION OF THE INVENTION

Referring to FIG. 1, the well casing finder assembly which is indicated generally at 10 is shown in the position which it normally assumes as it is lowered into a well casing 12. The assembly 10 is preferably made of plastic such as ABS, for example. The well casing 12 is preferably formed of mild steel, iron, or alloys which are attracted by a magnet. The assembly 10 is suspended within the casing 12 by a pair of electrical conductors 14, 15 which preferably have shrink fit footage counters 16 positioned at spaced intervals along their length so that the depth at which the assembly 10 is located beneath the ground level 18 can be readily ascertained. FIG. 1 is intended to represent conditions many years after the casing 12 was first installed. The casing 12 is shown as extending through an upper strata 20 of soil into a consolidated, permeable formation 22 which may be of sandstone or other porous rock, for example. The strata 22 is a material that evidently seemed to be stable and self-supporting when the casing 12 was installed in it since no well screen is indicated as being attached to the bottom portion 12' of the casing. The strata 22 is shown as containing a plurality of fissures 24 which developed over the years as the water being produced by the well passed through the porous formation 22 and was drawn upwardly through the casing 12. The fissures 24 are formed as sand-like granules (not shown) and tend to break off from the formation 22. Some of the granules tend to get drawn upwardly with the water being produced with the result that potential damage to pumps and other equipment is possible due to the presence of the sand in the water.

The assembly 10 includes an elongated central portion 25 to which a weighted tapered lower end portion 26 is threadedly attached by means of a threaded extension portion 26'. If desired, the end portion 26 can be formed of lead of a weight of at least about six ounces or can have lead embedded in plastic or other suitable material. An upper end portion 28 is preferably cemented into an elongated opening in the top of the central portion 25 and cooperates therewith to define an enlarged chamber 28' which supports a strain relief knot 56 in the conductors 14, 15. A circular drilled opening 30 is formed in the lower end of central portion 25. The opening 30 is substantially larger in diameter than the elongated magnet 32 which is positioned for radial movement within the chamber 30 by means of ball bearing members 34. After the opening 30 is drilled and the magnet 32 and balls 34 assembled therein, the lower end of the housing 25 is sealed by an insert member 36 which is cemented thereinto. The threaded portion 26' of the lower end 26 is then threaded into the insert 36. At the upper end of the central portion 25, a fixed elongated magnet 38 is positioned in a slot 40 as shown in FIG. 3 and firmly affixed thereto by non-magnetic epoxy 42 such as No. 1838 sold by the 3 M Company.

A slot 44 is formed in the body portion 25 adjacent the upper end of magnet 32. Positioned in the slot 44 is a glass enclosed reed switch assembly 46 which is encapsulated in a bed of non-magnetic epoxy 48. The contact blades 50, 52 of the reed switch are soldered to the conductors 15, 14 which pass down through a clearance hole 54 formed in member 25. To provide strain relief, the conductors 14, 15 have a knot 56 tied in them which is captured in the chamber 28' at the intersection of the middle and upper body portions 25, 28. The contact blades 50, 52 are normally in the open or non-contacting position as illustrated in FIGS. 1 and 4 where they are radially spaced from the upper end of the magnet 32. The contact blades are made of magnetic material but are of such a small mass as compared to the mass of the well casing 12 that they can have no effect on the magnet 32 which is normally magnetically biased toward the massive casing 12 and in axial alignment with the fixed magnet 38. However, when the assembly 10 is lowered sufficiently far within the casing to permit the movable magnet 32 to move beyond the lower end 12' of the casing, as illustrated in FIG. 2, the casing 12 will no longer magnetically attract the magnet 32. In this situation, the aforementioned magnetic contact blades 50, 52 will be able to attract the magnet 32 and draw it radially inwardly from its FIGS. 1 and 4 position to its FIGS. 2 and 5 position. As the magnet 32 reaches its FIG. 5 position it will cause the blades 50, 52 to be pulled toward its upper pole and into contact with each other, thereby closing the circuit controlled by the switch 46 to place conductors 14, 15 in series with each other and operate an indicator such as a light, bell or other warning signal (not shown) in circuit connection with the conductors 14, 15 at the upper end thereof.

Although it would be theoretically possible to utilize a single movable magnet 32, thus eliminating the fixed magnet 38, and still obtain an indication when the bottom of the casing is reached, it is preferred to use two magnets, as shown, in order to enhance the contact between the assembly 10 and the casing wall 12 as the assembly is being lowered. The enhanced contact helps prevent the assembly 10 from bouncing free of the casing wall as it crosses pipe joints or other discontinuities in the smooth casing wall. The weight of the instrument and the strength of the magnets should be such that the instrument can be lowered inside a magnetic casing while the magnets hold it against the casing.

Although the device has been shown in relationship to a well casing made of magnetic steel or other magnetic material, it is obvious that a determination of the location of the lower end of the casing could also be made in the situation where the casing is plastic and thus non-magnetic but has a magnetic steel well screen attached at the lower end thereof. In such a situation, the magnet 32 would assume its radially innermost position while being lowered through the non-magnetic casing and would move radially outwardly when contact was made with the steel well screen. If the majority of casings to be checked by the instrument could be expected to be plastic then, in order to reduce battery drain, it might be desirable to use a different circuit or a reed switch that was normally open when the magnet was in its innermost position.

I claim as my invention:

1. An instrument for locating the depth of the end of an unknown length of well casing comprising an electrically conducting cable member, an elongated body member suspended from said cable member, a fixed magnet member positioned internally of said body member adjacent one side surface of said body member, a magnetically operated switch positioned inside said body member, said switch having a pair of contacts connected to conductors in said cable which are adapted to operate an indicator device, said contacts being movable into or out of contact with each other by changes in the proximity of a radially movable magnet located within said body member at an axial distance from said fixed magnet, said magnets having their axes in the same radial plane and said movable magnet being generally axially aligned with said fixed magnet when in its radially outermost position, said movable magnet being magnetically biased to its radially outermost position when magnetically attracted material is located immediately adjacent the outer surface of the instrument, and said movable magnet being magnetically biased to its radially innermost position by the attraction of one or more of the contacts of said switch when no magnetically attracted material is located immediately adjacent the outer surface of said instrument.

2. The instrument of claim 1 wherein said fixed magnet is positioned upwardly from said movable magnet.

3. The instrument of claim 1 wherein said contacts are normally open when said instrument is being lowered inside a casing which magnetically attracts said movable magnet.

4. The instrument of claim 3 wherein said switch is a magnetic reed switch.

5. The instrument of claim 1 wherein said body member is plastic except for its lower end which is formed at least substantially of lead, said instrument having a weight sufficient to permit it to descend into a magnetic well casing while in engagement with the wall of said casing most closely adjacent to said magnets.

* * * * *